(12) United States Patent
Kiest, Jr.

(10) Patent No.: US 10,683,959 B2
(45) Date of Patent: Jun. 16, 2020

(54) METHOD AND APPARATUS FOR REPAIRING A LENGTH OF PIPE OR A MAIN/LATERAL PIPE JUNCTION

(71) Applicant: LMK Technologies LLC, Ottawa, IL (US)

(72) Inventor: Larry W. Kiest, Jr., Ottawa, IL (US)

(73) Assignee: LMK Technologies, LLC, Ottawa, IL (US)

( * ) Notice: Subject to any disclaimer, the term of this patent is extended or adjusted under 35 U.S.C. 154(b) by 107 days.

(21) Appl. No.: 15/785,622

(22) Filed: Oct. 17, 2017

(65) Prior Publication Data
US 2019/0113168 A1   Apr. 18, 2019

(51) Int. Cl.
| F16L 55/16 | (2006.01) |
| F16L 55/165 | (2006.01) |
| F16L 55/26 | (2006.01) |
| F16L 55/18 | (2006.01) |
| F16L 55/179 | (2006.01) |

(52) U.S. Cl.
CPC ....... *F16L 55/1651* (2013.01); *F16L 55/1656* (2013.01); *F16L 55/179* (2013.01); *F16L 55/18* (2013.01); *F16L 55/265* (2013.01); *F16L 55/1653* (2013.01)

(58) Field of Classification Search
CPC . F16L 55/1651; F16L 55/1656; F16L 55/179; F16L 55/18; F16L 55/265; F16L 55/1653
USPC ........................ 138/97, 98; 405/150.1, 184.2
See application file for complete search history.

(56) References Cited

U.S. PATENT DOCUMENTS

| 1,861,726 | A | 6/1932 | Trout |
| 3,773,593 | A | 11/1973 | Casadevall et al. |
| 3,781,966 | A | 1/1974 | Lieberman |

(Continued)

FOREIGN PATENT DOCUMENTS

| CA | 2674984 | 2/2011 |
| DE | G9313379.0 | 12/1993 |

(Continued)

OTHER PUBLICATIONS

Search Report for co-pending PCT/US2008/074001 listing relevant art cited by the International Searching Authority.

(Continued)

*Primary Examiner* — James F Hook
(74) *Attorney, Agent, or Firm* — Nyemaster Goode, P.C.

(57) ABSTRACT

A method and assembly for sealing an opening in a pipe wherein the opening is a damaged/cracked section in a length of pipe or the junction between a main pipe and a lateral pipe. The assembly includes a sealing member attached to a positioning tube such as preliner. The sealing member is combined with the preliner so that when the assembly is positioned in the main pipe, the sealing member corresponds with the opening. The sealing member is sized such that it extends along the main pipe on opposite sides of the opening. A mainline liner is installed within the preliner. In some embodiments, after the mainline liner cures and hardens, a cutter is used to cut an opening in the mainline liner, preliner, and sealing member to reinstate service to the lateral pipe. The sealing member remains in place around the periphery of the lateral pipe junction to act as a water stop at the opening.

28 Claims, 10 Drawing Sheets

(56) References Cited

U.S. PATENT DOCUMENTS

| | | | |
|---|---|---|---|
| 3,894,131 A | 7/1975 | Speech | |
| 4,522,432 A | 6/1985 | Press | |
| 5,167,258 A * | 12/1992 | Rice | E03F 3/06 138/97 |
| 5,340,160 A | 8/1994 | Meijers et al. | |
| 5,368,075 A | 11/1994 | Baro et al. | |
| 5,393,481 A | 2/1995 | Wood | |
| 5,411,060 A * | 5/1995 | Chandler | B29C 63/34 138/103 |
| 5,474,823 A | 12/1995 | Kamiyama et al. | |
| 5,511,573 A | 4/1996 | Corte | |
| 5,566,719 A | 10/1996 | Kamiyama et al. | |
| 5,587,126 A | 12/1996 | Steketee, Jr. | |
| 5,609,439 A | 3/1997 | Schreiner et al. | |
| 5,738,146 A | 4/1998 | Abe | |
| 5,765,597 A | 6/1998 | Kiest et al. | |
| 5,794,663 A | 8/1998 | Kiest et al. | |
| 5,879,501 A | 3/1999 | Livingston | |
| 5,915,419 A | 6/1999 | Tweedie et al. | |
| 5,916,406 A | 6/1999 | Kamiyama et al. | |
| 5,924,436 A | 7/1999 | Kitani et al. | |
| 5,927,341 A | 7/1999 | Taylor | |
| 5,944,058 A | 8/1999 | Kamiyama et al. | |
| 5,950,682 A | 9/1999 | Kiest, Jr. | |
| 5,971,032 A | 10/1999 | Ward | |
| 6,021,815 A | 2/2000 | Kiest et al. | |
| 6,031,371 A | 2/2000 | Smart | |
| 6,039,079 A | 3/2000 | Kiest, Jr. | |
| 6,044,867 A | 4/2000 | Tweedie et al. | |
| 6,068,725 A | 5/2000 | Tweedie et al. | |
| 6,101,951 A | 8/2000 | Sigel | |
| 6,105,619 A | 8/2000 | Kiest, Jr. | |
| 6,123,109 A | 9/2000 | Kamiyama et al. | |
| 6,158,473 A | 12/2000 | Kamiyama et al. | |
| 6,199,591 B1 | 3/2001 | Kiest, Jr. | |
| 6,328,310 B1 | 12/2001 | Chikaraishi | |
| 6,337,114 B1 | 1/2002 | Wood et al. | |
| 6,416,692 B1 | 7/2002 | Iwasaki-Higbee | |
| 6,541,106 B1 | 4/2003 | von Fay et al. | |
| 6,641,687 B2 | 11/2003 | Kiest et al. | |
| 6,641,688 B1 | 11/2003 | Gearhart | |
| 6,651,699 B2 | 11/2003 | Kweon | |
| 6,688,337 B2 | 2/2004 | Ward | |
| 6,899,832 B2 | 5/2005 | Wood | |
| 6,994,118 B2 | 2/2006 | Kiest, Jr. | |
| 7,028,716 B2 | 4/2006 | Kaneta et al. | |
| 7,094,308 B1 | 8/2006 | Gearhart | |
| 7,131,791 B2 | 11/2006 | Whittaker et al. | |
| 7,311,121 B2 | 12/2007 | Kamiyama et al. | |
| 7,398,797 B2 | 7/2008 | Kamiyama | |
| 7,481,246 B2 | 1/2009 | Kamiyama et al. | |
| 7,670,086 B2 | 3/2010 | Kiest, Jr. et al. | |
| 7,720,570 B2 | 5/2010 | Close et al. | |
| 7,849,883 B2 | 12/2010 | Manners | |
| 7,975,726 B2 | 7/2011 | Kiest | |
| 7,987,873 B2 | 8/2011 | Kiest, Jr. | |
| 8,240,340 B2 | 8/2012 | Kiest, Jr. | |
| 8,240,341 B2 | 8/2012 | Kiest | |
| 8,316,892 B2 | 11/2012 | Warren | |
| 8,640,737 B2 | 2/2014 | Kiest | |
| 8,721,216 B2 | 5/2014 | Kiest, Jr. | |
| 9,714,735 B2 * | 7/2017 | Kiest, Jr. | E02D 29/12 |
| 9,791,089 B2 | 10/2017 | Kiest | |
| 2007/0137785 A1 | 6/2007 | Noll | |
| 2009/0056823 A1 * | 3/2009 | Kiest, Jr. | F16L 55/1651 138/98 |
| 2011/0203719 A1 * | 8/2011 | Kiest, Jr. | F16L 55/1651 156/94 |
| 2012/0175004 A1 * | 7/2012 | Kiest, Jr. | F16L 55/1651 138/98 |
| 2014/0121324 A1 * | 5/2014 | Boutrid | C08L 67/03 525/177 |
| 2017/0028668 A1 * | 2/2017 | Boutrid | B32B 5/02 |
| 2017/0146178 A1 | 5/2017 | Kiest, Jr. | |

FOREIGN PATENT DOCUMENTS

| | | |
|---|---|---|
| DE | 4421290 | 12/1995 |
| EP | 0 506 181 | 9/1992 |
| EP | 0564741 | 10/1993 |
| EP | 1070902 | 1/2001 |
| EP | 1447610 | 8/2004 |
| JP | 2001-269998 | 10/2001 |

OTHER PUBLICATIONS

PCTUS1856184 International Search Report & Written Opinion—dated Mar. 4, 2019.

* cited by examiner

METHOD AND APPARATUS FOR REPAIRING A LENGTH OF PIPE OR A MAIN/LATERAL PIPE JUNCTION

FIELD OF THE INVENTION

The invention relates generally to an apparatus and method for repairing or sealing an opening in a pipe such as a damaged pipe portion or the junction between two pipes. More particularly, but not exclusively, the invention relates to a kit, assembly, apparatus, and method for positioning a sealing member at an opening in a pipe which may be a damaged portion of pipe or the junction between two pipes.

BACKGROUND

As the infrastructure of major cities and towns in the developed world age, the sewer systems weaken. Pipe degradation, system blockage, water infiltration, and sewer leakage are major problems that aging sewer systems experience. As these problems persist, the sewer system may eventually experience total failure and entire sections of the sewer system may collapse. As a result, sinkholes may form and sewers may back up into homes and places of business. One method of addressing this critical infrastructure problem is the use of pipe lining techniques to rehabilitate existing sewer systems.

Cured-in-place pipelining is one such technique that includes rehabilitating an existing sewer system by creating a new pipe within an existing pipe. A liner, impregnated with a resinous material capable of curing and hardening, is inverted or pulled into a damaged pipe. The liner is pressed toward the wall of the existing pipe, and the resinous material is allowed to cure and harden. The result is a replacement pipe having the older pipe or "host pipe" on the exterior. The cured-in-place pipe acts to alleviate the problems caused by structural defects and blockages in the existing sewer system.

Mainline sewer pipes are normally lined from manhole to manhole. In sewer systems where the main pipes have been rehabilitated with a cured-in-place pipe, unsealed connections at service and lateral pipe junctions (collectively referred to herein as "lateral pipes" or "lateral pipe lines") create problems. An unsealed connection is generally a product of installing a pipe liner within the main pipe and over the lateral pipe junction, then using a cutting tool on the pipe liner at the connection to reinstate service to the lateral pipe. Current methods for cutting/reinstating service to lateral pipes are described for example in U.S. Pat. No. 7,131,791 (Whittaker et. al.), which is incorporated by reference.

Some problems related to unsealed connections are caused by shrinkage of the pipe liner and unsealed connections at service/lateral pipe junctions. Shrinkage of a pipe liner after installation presents a problem for the longevity and effectiveness of a sewer system, especially at lateral pipe junctions. Most resinous materials experience some shrinkage after installation within an existing pipe. An annulus between the host pipe and the pipe liner is created often due to this shrinkage of the resinous material. The amount of shrinkage by a pipe liner depends on the resin used, the thickness of the liner, properly cooling the liner under controlled inflation pressure, long-term creep when subjected to hydraulic loading, as well as several other factors. This shrinkage allows water and debris to enter into the sewer system and migrate between the host pipe and the pipe liner from the ground surrounding the pipes, allows sewage to escape into the ground surrounding the pipes, and allows roots from surrounding vegetation to enter the annulus between the host pipe and the pipe liner.

Therefore, a need in the art exists for a new apparatus and method for effectively repairing an opening in a pipe which may be a crack in a length of pipe or the junction between two buried pipes.

SUMMARY

It is therefore a primary object, feature, and/or advantage of the present invention to provide an improved apparatus and method for repairing or sealing (collectively "repairing") an opening in a pipe such as a damaged pipe portion or the junction between two pipes that overcomes deficiencies in the prior art.

It is another object, feature, and/or advantage of the present invention to position a sealing member at an opening in a pipe using a liner or a preliner.

It is another object, feature, and/or advantage of the present invention to provide an apparatus and method for repairing an opening in a pipe which is economical to manufacture, easy to install, and durable in use.

It is another object, feature, and/or advantage of the present invention to provide an improved method and apparatus for repairing an opening in a pipe that provides a seal around the opening.

These and/or other objects, features, and advantages of the present invention will be apparent to those skilled in the art. The present invention is not to be limited to or by these objects, features and advantages, and no single embodiment need exhibit every object, feature, and/or advantage.

According to one aspect of the invention, a method and assembly for repairing an opening in a pipe is provided. The opening may be a damaged/cracked portion along a length of pipe or it may be the junction between two pipes. The assembly includes a sealing member attached to a positioning tube such as a preliner. The assembly is positioned in the main pipe by any suitable method. In some methods the assembly is pulled into place using a positioning device, such as a rope or a robot and in other methods the assembly is inverted into the main pipe from a manhole or launcher device. The preliner may be made from an impermeable polymer material and the sealing member may be made from a hydrophilic or hydrophobic material. The sealing member is combined with the preliner so that when the assembly is positioned in the main pipe, the sealing member corresponds with the opening. The sealing member may be attached to either side of the preliner. In one embodiment, the sealing member has a tubular shape and surrounds the preliner. The sealing member is sized such that it extends along the main pipe on opposite sides of the opening. For example, if the opening is a six inch lateral pipe, the sealing member would be eight or ten inches long to allow a portion of the sealing member to contact the main pipe on either side of the lateral pipe opening. Also, the sealing member would be sized to approximate the diameter of the main pipe. In one embodiment, after the preliner and sealing member are properly positioned, then a mainline liner is installed with the preliner between the host pipe and the new mainline liner. In another embodiment, the preliner and sealing member may be positioned in the pipe along with the liner in a single step. In some embodiments the liner is installed under pressure to help press the components toward the wall of the pipe. Other embodiments further include positioning a bladder assembly inside the liner then inflating the bladder assembly to help press the components against the wall of the pipe. Some embodiments include a plurality of sealing members combined with the preliner which align with a plurality of corresponding openings upon installation within the main pipe. In embodiments where the opening is a pipe junction, after the mainline liner cures and hardens, a cutter is used to cut an opening in the mainline liner, preliner, and sealing member to reinstate service to the lateral pipe. The sealing member remains in place around the periphery of the lateral pipe junction to act as a water stop at the main/lateral junction.

According to another aspect of the present invention, a method and assembly for repairing an opening in a pipe. The opening may be a damaged/cracked portion along a length of pipe or it may be a damaged/cracked portion of a pipe near the junction between two pipes. This embodiment of the invention includes many of the features described above. The sealing member may be a sleeve or collar that is constructed of or impregnated with a hydrophilic or hydrophobic material such as a hydrophilic or hydrophobic chemical paste or grout. In one embodiment the sealing member is impregnated after it has been attached to the preliner. The sealing member is used as a carrier to transport the expandable liquid grout material to the damaged portion of the pipe, and all or nearly all of the material is expelled from the sealing member when pressed toward a pipe by a pressurized liner or bladder assembly. This leaves the sealing member with minimal thickness after installation. In this manner the grout material penetrates through the damaged portion and to an area in the soil surrounding the damaged portion. In one embodiment the impregnated sealing member is disc-shaped, with an aperture through the center, and is made of open cell foam material. In other embodiment the impregnated sealing member is a tubular sleeve which surrounds the preliner.

According to another aspect of the present invention, methods for using one or more of the assemblies described above to seal an opening in a pipe are provided. The opening may be a damaged/cracked portion along a length of pipe or it may be the junction between a main pipe and a lateral pipe. The methods include providing the assembly for repairing the opening, attaching the sealing member to the preliner, and placing the preliner and sealing member in the main pipe line using pull-in-place or inversion methods. The sealing member is aligned with the opening so that at least a portion of the sealing member extends into the main pipe line on either side of the opening. The mainline liner is impregnated with a material capable of curing and hardening and is positioned in the main pipe and pressed toward an inner wall of the main pipe and over the sealing member. The liner may be positioned under pressure to help press the components toward the wall of the pipe. The sealing member may be attached to either side of the preliner resulting in the sealing member being between the preliner and the wall of the main pipe line or the sealing member being between the liner and the preliner. The mainline liner may be pressed toward the inner wall of the main pipe using an inflatable bladder assembly or without using a bladder as disclosed in U.S. Pat. No. 7,845,372. In embodiments where the opening is a pipe junction, after the liner cures and hardens, a cutter is used to cut an opening in the mainline liner, preliner, and sealing member to reinstate service to the lateral pipe. The sealing member remains in place to act as a water stop at the opening.

According to one aspect of the present invention, a method and assembly for repairing an opening in a pipe is provided. The opening may be a damaged/cracked portion along a length of pipe or it may be the junction between a main pipe and a lateral pipe. This embodiment is similar to any of the embodiments described above, except the mainline liner is used as the positioning tube instead of a preliner. The liner has an exterior surface which includes an impermeable coating such as a plastic. The sealing member is attached directly to the exterior surface of the liner and the liner is pulled into place within the pipeline. In some embodiments the liner is installed under pressure to help press the components toward the wall of the pipe. Other embodiments further include positioning a bladder assembly inside the liner then inflating the bladder assembly to help press the components against the wall of the pipe. In embodiments where the opening is a pipe junction, after the mainline liner cures and hardens, a cutter is used to cut an opening in the mainline liner and sealing member to reinstate service to the lateral pipe. The sealing member remains in place around the periphery of the lateral pipe junction to act as a water stop at the main/lateral junction.

According to one aspect of the invention, a method and assembly for repairing an opening in a pipe is provided. The opening may be a damaged/cracked portion along a length of pipe or it may be the junction between a main pipe and a lateral pipe. The assembly includes a sealing member and a liner assembly (but no preliner). The sealing member may be a tubular sleeve that is constructed of or impregnated with a hydrophilic or hydrophobic material. The hydrophilic material may be such that the sealing member is collapsible, but capable of being placed back into an initial tubular conformation. In embodiments where the sealing member is a tubular sleeve, the tubular sleeve may include a flange attached to at least a portion of an end thereof. In other embodiments the sealing member is a flat sheet or ring of hydrophilic material which does not surround the full circumference of the preliner and is attached to the preliner with clips, snaps, adhesive, etc. The sealing member is positioned at the opening by a robot or manually if the pipe is large enough to accommodate a person. The sealing member may be self-supporting or a mechanical fastener such as a metal ring may be used to help support the sealing member in its proper position prior to the instillation of the liner. As one example, an inflatable packer could carry the sealing member with a stainless steel ring that has ratchets. When the packer is inflated, the ring would expand and lock in place to support the hydrophilic sealing member. Then, the mainline liner is installed with the sealing member between the host pipe and the new mainline liner. In some embodiments the liner is installed under pressure to help press the components toward the wall of the pipe. Other embodiments further include positioning a bladder assembly inside the liner then inflating the bladder assembly to help press the components against the wall of the pipe. In embodiments where the opening is a pipe junction, after the mainline liner cures and hardens, a cutter is used to cut an opening in the mainline liner, preliner, and sealing member to reinstate service to the lateral pipe. The sealing member remains in place around the periphery of the opening to act as a water stop at the opening.

According to another aspect of the invention, an assembly for repairing an opening in a pipe is provided. The opening may be a damaged/cracked section in a length of pipe or it may be the junction between a main pipe and a lateral pipe. In this embodiment the preliner is the sealing member. The preliner is adapted to be positioned in the main pipe. The preliner is formed from a hydrophilic or hydrophobic material such as a hydrophilic or hydrophobic rubber or thermoplastic that is hydrophilic or hydrophobic. In this embodiment there is no need for a separate sealing member combined with the preliner. The preliner is pulled in place or inverted into the main pipe liner so that it covers one or more of the openings. In one embodiment the mainline liner is pulled or inverted into place inside of the preliner after the preliner has been positioned. In another embodiment the preliner and mainline liner are pulled or inverted into place at the same time in a single step. In embodiments where the opening is a pipe junction, after the liner cures and hardens, a cutter is used to reinstate service to the lateral pipe. The preliner remains in place to act as a water stop at the opening.

According to another aspect of the present invention, methods for using assemblies like the one disclosed in the previous paragraph to repair an opening in a pipe are provided. The opening may be a damaged/cracked section in a length of pipe or it may be the junction between a main pipe and a lateral pipe. The methods include providing the assembly for sealing the opening, and positioning the preliner in the main pipe line using pull-in-place or inversion methods so that the preliner extends into the main pipe line on either side of the opening. The mainline liner is positioned in the main pipe and pressed toward an inner wall of the main pipe and over the sealing member after the preliner has been positioned or along with the positioning of the preliner. The mainline liner may be pressed toward the inner wall of the main pipe using an inflatable bladder or without using a bladder as disclosed in U.S. Pat. No. 7,845,372. In embodiments where the opening is a pipe junction, after the liner cures and hardens, a cutter is used to reinstate service to the lateral pipe. The preliner remains in place to act as a water stop at the opening.

Another aspect of the invention is directed to assemblies and methods similar to those described above. In this embodiment the assembly includes more than one sealing members adapted to be positioned at more than one corresponding openings along a length of pipe.

DETAILED DESCRIPTION

Figure 1:
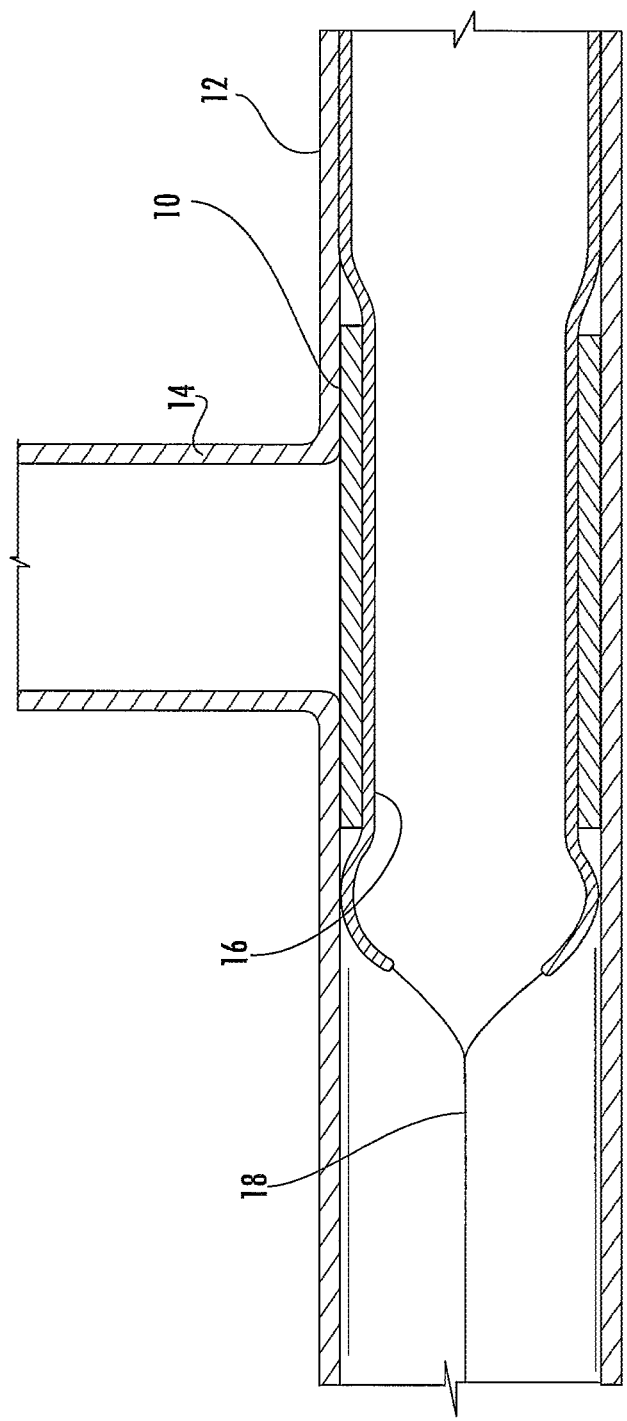
FIG. 1 is a sectional view of an embodiment of the invention showing the assembly being pulled into place at the intersection of a main pipe line and a lateral pipe line.
Figure 2:
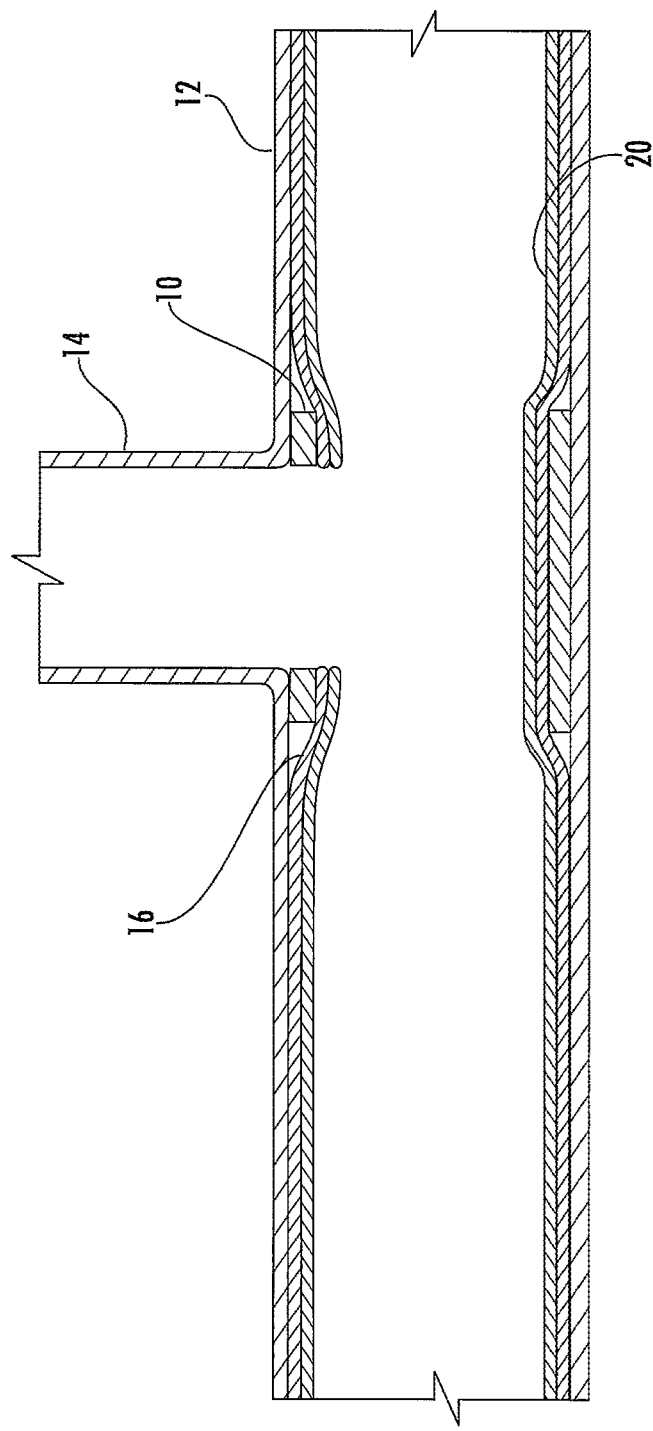
FIG. 2 is a sectional view of the embodiment shown in FIG. 1 wherein access has been restored to the lateral pipe line.

FIGS. 1 and 2 show a first embodiment of the invention wherein an assembly is provided for helping to repair an opening in a pipe. The opening may be a damaged/cracked section in a length of pipe or it may be the junction between a main pipe and a lateral pipe. For convenience, FIGS. 1 and 2 and the following embodiments will be described primarily with reference to embodiments where the opening is the junction of a first pipe and a second pipe. The first and second pipes may be a main pipe line 12 and a lateral pipe line 14. The assembly includes a sealing member 10 attached to a positioning tube such as preliner 16 which carries the sealing member 10 through the main pipe line 12 to its desired position at the main/lateral pipe junction. The sealing member 10 is attached to the preliner 16 by stitching, stapling, by use of an adhesive or other suitable attachment means. The assembly further includes a liner 20 positioned inside the preliner 16 as described below in more detail. In some embodiments the preliner 16 is formed of a moisture impervious polymer material and may be thermoplastic, polyurethane, polyvinyl chloride, polyethylene or other similar material. The sealing member 10 may be made from or impregnated with a hydrophilic or hydrophobic material.

The sealing member 10 may be a single, unitary piece that may be made by vulcanization processes. Such methods include wrapping or extruding polymeric material around a mandrel and placing the loaded mandrel into a vulcanizing autoclave for a predetermined period of time. A vulcanization method is preferred for the sealing member 10, because the material may be formed in a tube of considerable length to be cut into shorter sealing members. Such a method would decrease the cost of producing the sealing-member 10 compared to other methods, allowing for the simultaneous production of a plurality of units. Other methods of forming the sealing member 10 include casting or molding methods, including but not limited to resin casting, injection molding, blow molding, or extrusion molding.

In one embodiment the sealing member 10 is less than about ten millimeters in thickness. In other embodiments the sealing member 10 is two-three millimeters thick. In embodiments where the sealing member 10 is a tubular sleeve, the sleeve is preferably produced directly in the form of a tube. However, it should also be appreciated that alternative constructions of a tube are possible, such as where a sheet of material is formed into a tube and fused together by thermal bonding, sewing, adhesives, or other mechanical bonding methods. It should also be noted that the sealing member 10 may be formed by taking a sheet of material and forming it into a tube by overlapping the ends, and then securing the tubular form within the pipe. Therefore, a bonded, continuous tube is not required to practice this invention. However, the sealing member 10 preferably comprises a generally uniform wall thickness along the length of the sealing member. It should also be noted that the sealing member 10 may have a non-tubular configuration as described below in more detail.

Figure 5:
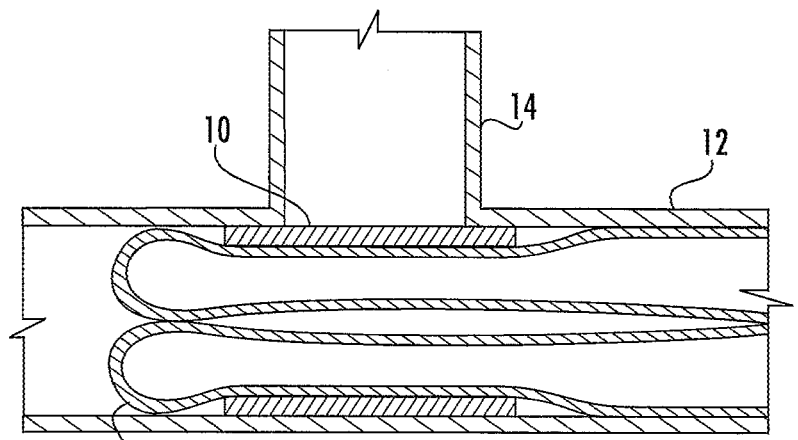
FIG. 5 is a sectional view of the embodiment shown in FIGS. 3 and 4 showing the assembly positioned over the opening, which is an intersection of the main pipe line and the lateral pipe line.

The sealing member 10 is combined with the preliner 16 so that when the assembly is positioned in the main pipe 12, the sealing member 10 corresponds with the lateral pipe junction as shown in FIGS. 1 and 5. In some embodiments the assembly includes more than one sealing member 10 attached to the preliner 16 adapted to be positioned over more than one corresponding lateral pipe junction within a single main pipe line 12. In one embodiment, the sealing member 10 has a tubular shape and surrounds the preliner 16. The sealing member 10 is sized such that it extends along the main pipe 12 on opposite sides of the lateral pipe junction. For example, if the lateral pipe line 14 was a six inch pipe, the sealing member 10 would be eight or ten inches long to allow a portion of the sealing member 10 to contact the main pipe 12 on either side of the lateral pipe 14 opening. Also, in this embodiment the sealing member 10 would be sized to approximate the diameter of the main pipe.

Figure 3:
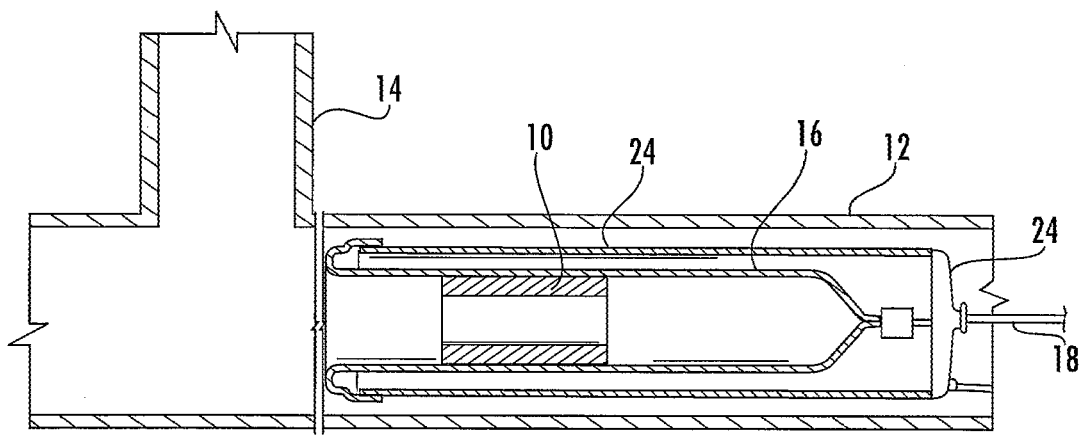
FIG. 3 is a sectional view of an embodiment of the invention showing the assembly about to be inverted into the main pipe line.
Figure 4:
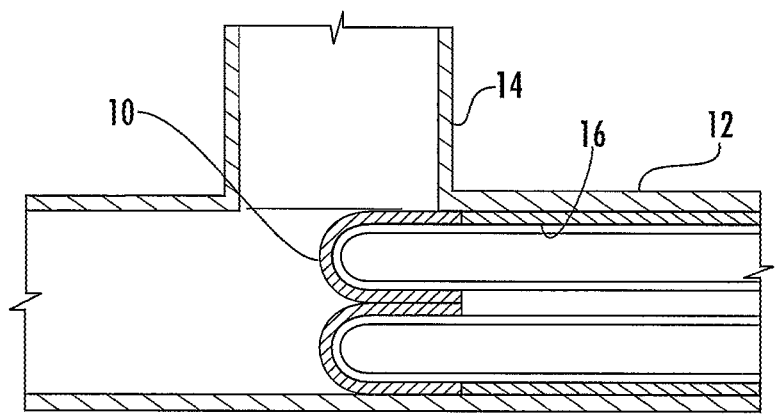
FIG. 4 is a sectional view of the embodiment shown in FIG. 3 showing the assembly being inverted into the main pipe line across an opening that is the junction between two pipes.

The assembly is positioned in the main pipe 12 by any suitable method. In the embodiment shown in FIGS. 1 and 2, the assembly is pulled into place by pulling on a rope 18 that is attached to an end of the assembly or by using a positioning device, such as a robot. In the embodiment shown in FIGS. 3-5, the assembly is inverted into the main pipe 12 from a manhole or launcher device 24. FIG. 3 shows a length of main pipe line 12 that separates the launcher device 24 from a lateral pipe junction. The distance between the launcher device 24 and the lateral pipe 14 is determined then the sealing member 10 is attached to the interior of the preliner 16 so that upon inversion the preliner has extended the appropriate distance from the launcher 24 to locate the sealing member 10 across the lateral pipe 14 opening. FIG. 4 shows the preliner 16 and sealing member 10 partially inverted, and FIG. 5 shows the sealing member 10 fully inverted across the lateral pipe 14 opening so that at least a portion of the sealing member 10 is positioned on opposite sides of the lateral pipe 14.

In one embodiment, after the preliner 16 and sealing member 10 are properly positioned, then a mainline liner 20 is installed with the preliner 16 between the host pipe and the new mainline liner 20. This is shown in FIGS. 1 and 2 wherein the preliner 16 and sealing member 10 are positioned in the pipe 12 (FIG. 1). The liner 20 is then installed inside the preliner 16 (FIG. 2) so that the preliner 16 is between the sealing member 10 and the liner 20. Any suitable liner 20 may be used. In some embodiments the liner 20 is a resin impregnated cured-in-place liner that is pulled or inverted into position within the preliner 16. In other embodiments the liner 20 is a folded liner or a spray-on liner. In some embodiments the liner 20 may be fluidly sealed on its ends and have a fluid-impermeable coating on one side, allowing it to be installed under pressure using a fluid pressure source without the use of a bladder. The inflation expands the assembly toward the walls of the pipe 12 and helps hold the assembly against the walls of the pipe 12 as the impregnated liner 20 cures and hardens. Other embodiments further include positioning a bladder assembly inside the liner 20 and then inflating the bladder assembly to help press the components against the wall of the pipe 12. After the mainline liner 20 cures and hardens, a cutter is used to cut an opening in the mainline liner 20, preliner 16, and sealing member 10 to reinstate service to the lateral pipe. The sealing member 10 remains in place around the periphery of the lateral pipe 14 junction to act as a water stop at the main/lateral junction.

In another embodiment, the preliner 16 and sealing member 10 may be positioned in the pipe 12 along with the liner in a single step.

Figure 6:
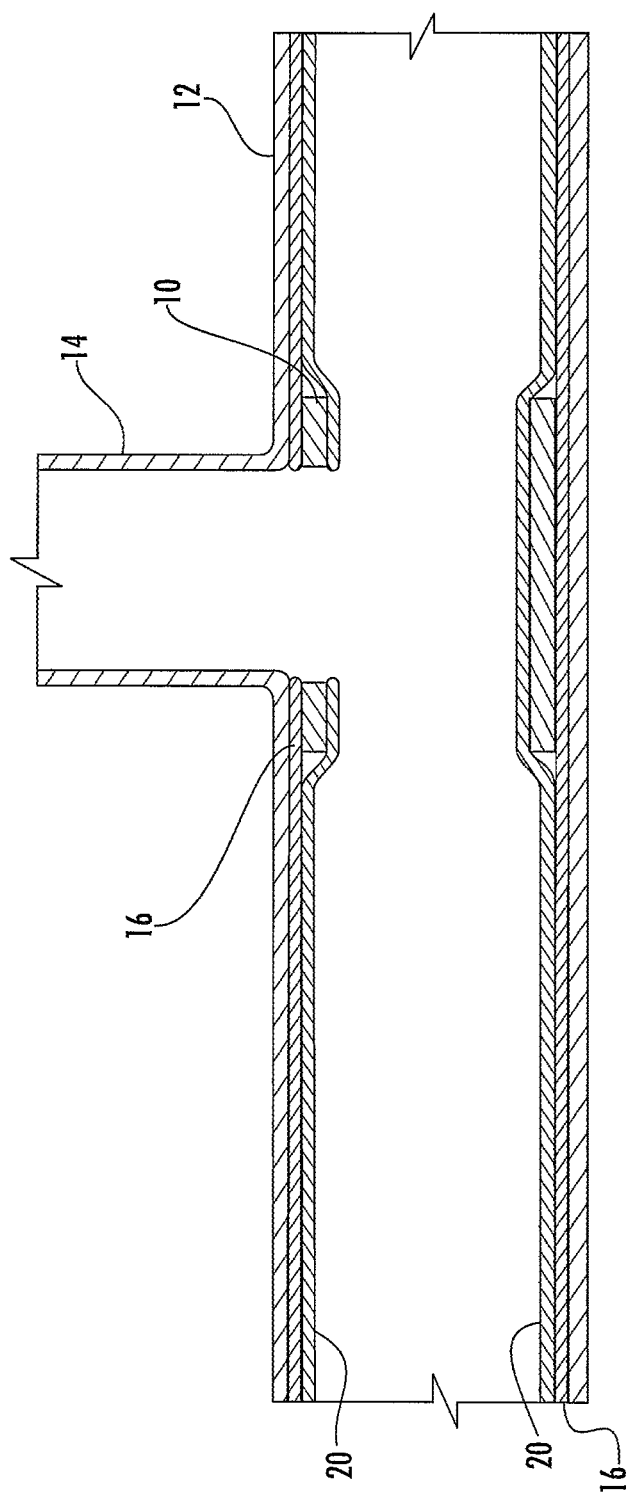
FIG. 6 is a sectional view of an embodiment showing the sealing member positioned between the preliner and the mainline liner.

FIG. 6 shows an alternate embodiment wherein the sealing member 10 is attached to the preliner 16 so that the sealing member 10 is between the preliner 16 and the mainline liner 20 after it is positioned in the pipe 12. In this embodiment the sealing member 10 is attached to the other side of the preliner 16.

Figure 7:
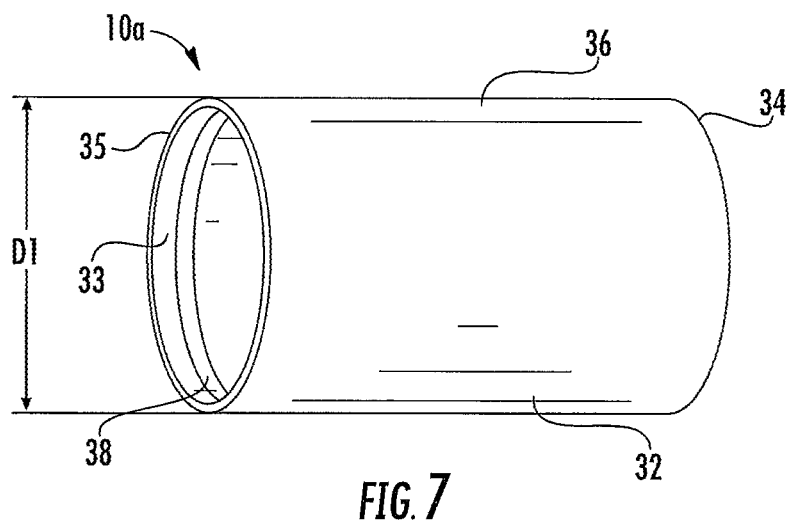
FIG. 7 is a perspective view of an embodiment where the sealing member is a tubular sleeve.
Figure 8:
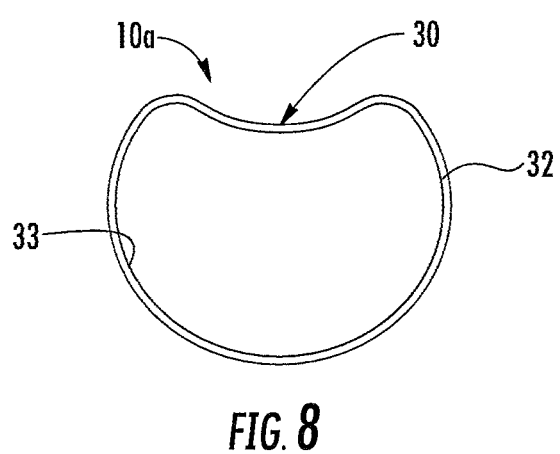
FIG. 8 is a sectional view of the tubular sleeve of FIG. 7 while placed in a strained conformation.
Figure 15:
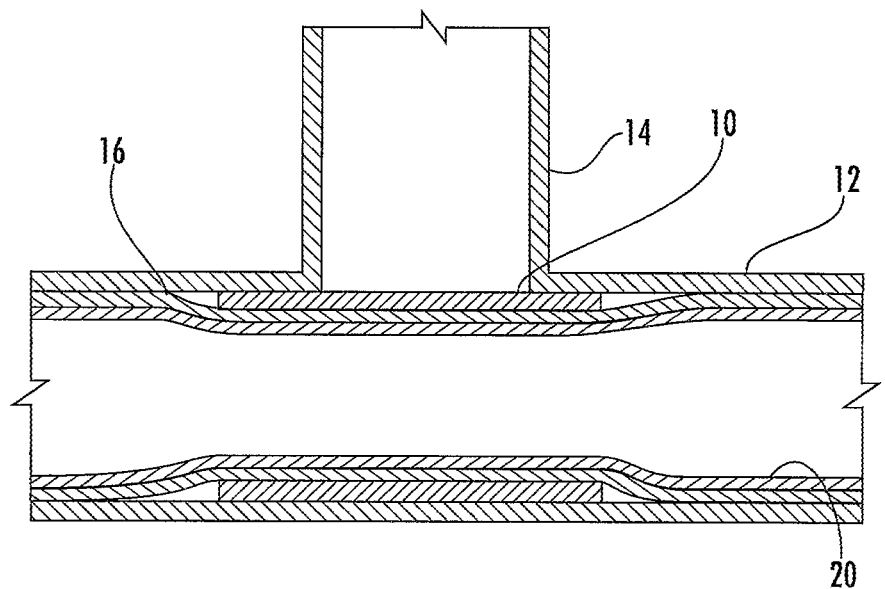
FIG. 15 is a sectional view of an embodiment showing the assembly positioned at the junction of the main pipe line and the lateral pipe line.
Figure 16:
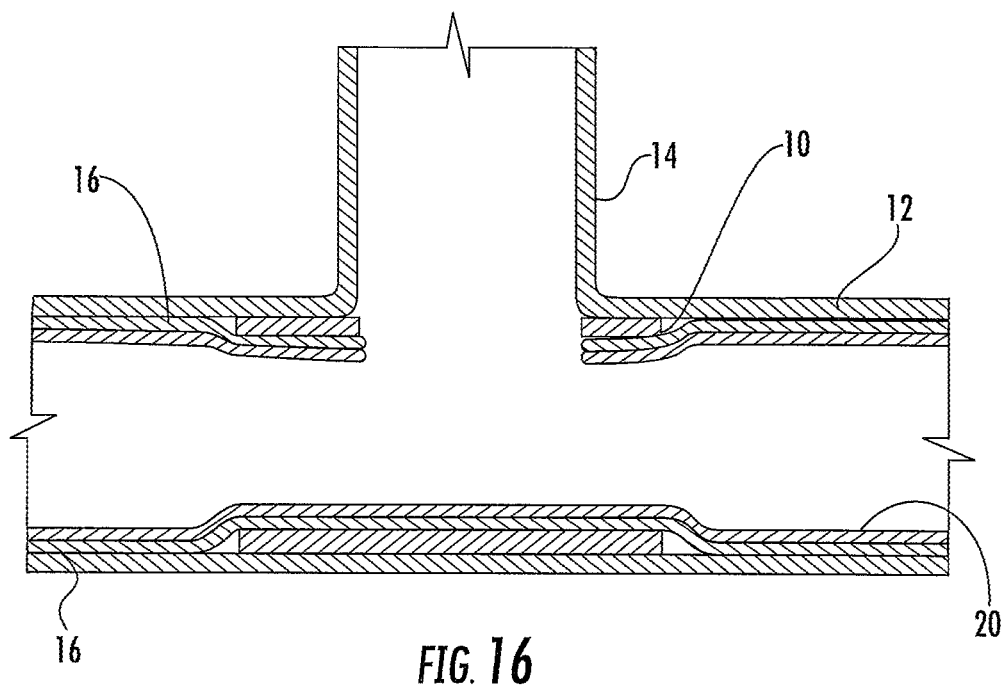
FIG. 16 is a sectional view of an embodiment where access has been restored to the lateral pipe line.

FIGS. 7-11 show various embodiments of the sealing member 10. While reference number 10 is used to generally refer to any sealing member throughout this disclosure, some specific embodiments are referred to with reference numbers 10a-10d. FIGS. 7 and 8 show an embodiment where the sealing member 10a is a tubular sleeve. The sealing member 10 may be a tubular sleeve that is constructed of or impregnated with a hydrophilic or hydrophobic material. In one embodiment, the sealing member 10a is a hydrophilic neoprene rubber having a hardness of less than 90 Shore A Durometer Scale. The hydrophilic material may be such that the sealing member 10a is collapsible, as shown in FIG. 8, but capable of being placed back into an initial tubular shape. In its partially collapsed configuration, the outer profile of the sealing member 10 is reduced, allowing an easier insertion of the sealing member 10 into the pipe 12. The tubular sleeve 10a may include a flange attached to at least a portion of an end thereof. The sealing member 10a may be used in embodiments where the assembly includes a sealing member 10 and a liner assembly 20 (but no preliner 16). The sealing member 10a may be rigid enough to retain its shape and position within the main pipe 12 before the liner 20 is installed. Other embodiments include a mechanical fastener 38 such as a metal ring adapted to retain the sealing member 10 against a wall of the pipe 12 before the liner 20 is positioned over the sealing member 10a. The sealing member 10a is positioned at the pipe junction by a robot or manually if the pipe is large enough to accommodate a person. As one example, an inflatable packer could carry the sealing member 10a with a mechanical fastener 38 that is a stainless steel ring having ratchets. When the packer is inflated, the ring 38 would expand and lock in place to support the hydrophilic sealing member 10a. Then, the mainline liner 20 is installed as described above with the sealing member 10a between the host pipe 12 and the new mainline liner 20 as shown in FIG. 15. After the mainline liner 20 cures and hardens, a cutter is used to cut an opening in the mainline liner 20, preliner 16, and sealing member 10a to reinstate service to the lateral pipe as shown in FIG. 16. The sealing member 10a remains in place around the junction of the lateral pipe 14 junction to act as a water stop at the main/lateral junction.

Figure 9:
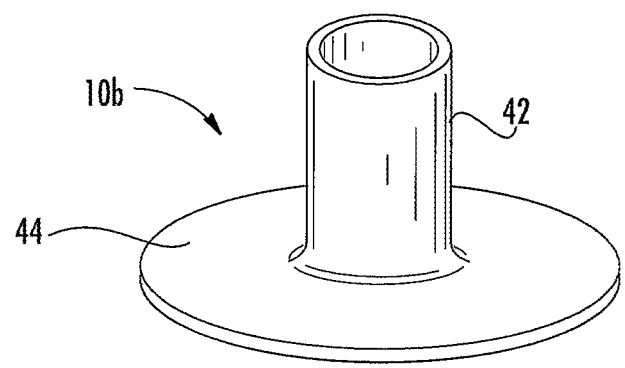
FIG. 9 is a perspective view of an embodiment where the sealing member is a brim-style junction liner configured for installation at a tee junction prior to installation within a pipe.
Figure 10:
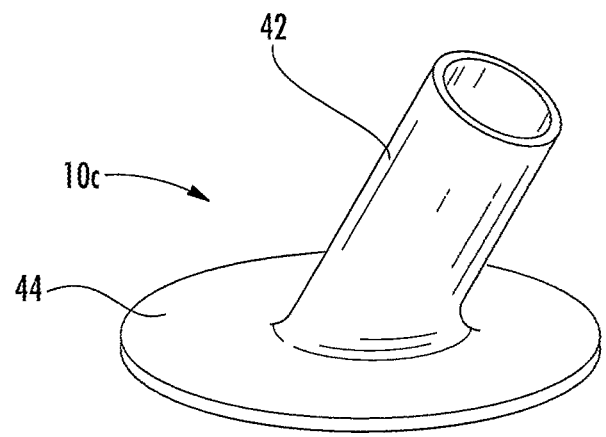
FIG. 10 is a perspective view of an embodiment where the sealing member is a brim-style junction liner configured for installation at a wye junction prior to installation within a pipe.

FIGS. 9 and 10 show an embodiment where the sealing member 10b, 10c is a brim-style junction liner having a flange member combined with a tubular member to generally form the shape of a top hat. The brim-style junction liner adapted to be placed at a main/lateral pipe junction with the flange portion adapted to be positioned in the main pipe 12 and the tubular portion adapted to be placed in the lateral pipe 14. FIG. 9 shows an embodiment where the sealing member 10b is a brim-style junction liner configured for installation at a tee junction prior to installation within a pipe. FIG. 10 shows an embodiment where the sealing member 10c is a brim-style junction liner configured for installation at a wye junction prior to installation within a pipe.

Figure 11:
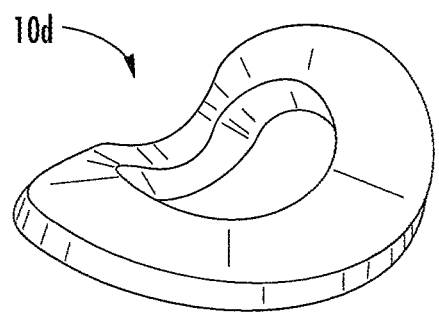
FIG. 11 is a perspective view of an embodiment where the sealing member is a ring-shaped gasket.
Figure 12:
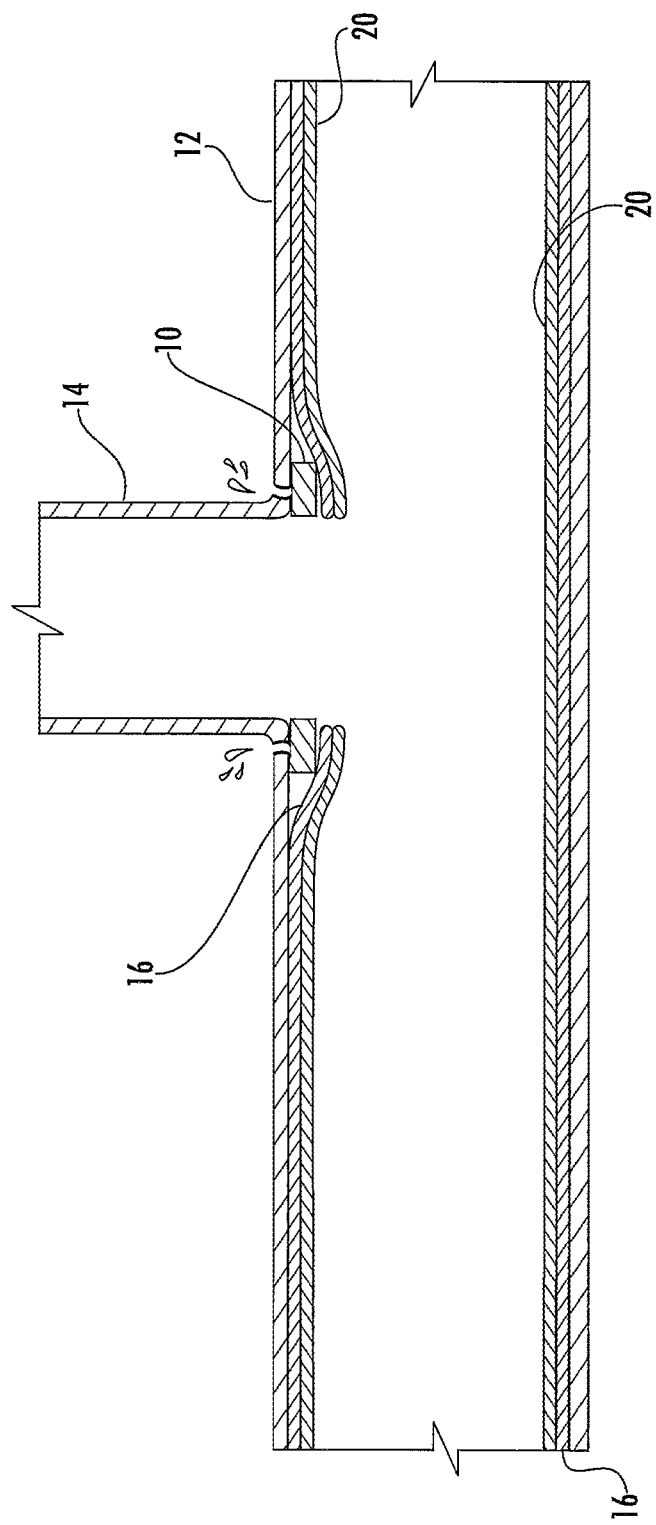
FIG. 12 is a sectional view of an embodiment where the sealing member is a ring-shaped gasket positioned around the junction between the main pipe line and the lateral pipe line.

FIGS. 11 and 12 show an embodiment where the sealing member 10d is ring or disc-shaped with an aperture through the center. The sealing member 10d does not extend around the full circumference of the preliner 16. Instead, the sealing member 10d is adapted to only surround the lateral pipe 14 opening at the main/lateral junction. The sealing member 10d is attached to the preliner 16 by any suitable means, including with clips, snaps, adhesive, etc.

FIG. 12 shows an embodiment where there are existing openings/cracks in the pipeline wall. To help prevent infiltration or leakage, in one embodiment the sealing member 10 is an open cell material impregnated with a hydrophilic or hydrophobic material such as a hydrophilic or hydrophobic chemical paste or grout. The sealing member 10 is used as a carrier to transport the liquid grout material to a pipe juncture. All or nearly all of the liquid grout material is expelled from the sealing member 10 when pressed toward the pipe 12 leaving the sealing member with minimal thickness. In this manner the grout material penetrates through the damaged portion of the junction between the main pipe 12 and the lateral pipe 14 and to an area in the soil surrounding the pipe junction. In one embodiment, the sealing member 10 is attached to the preliner 16 before being impregnated with the hydrophilic or hydrophobic material. As with the embodiments discussed above, a resin impregnated liner 20 is positioned inside the preliner 16. The sealing member shown in FIG. 12 is sealing member 10d shown in FIG. 11; however, any suitable sealing member 10 may be used.

Figure 13:
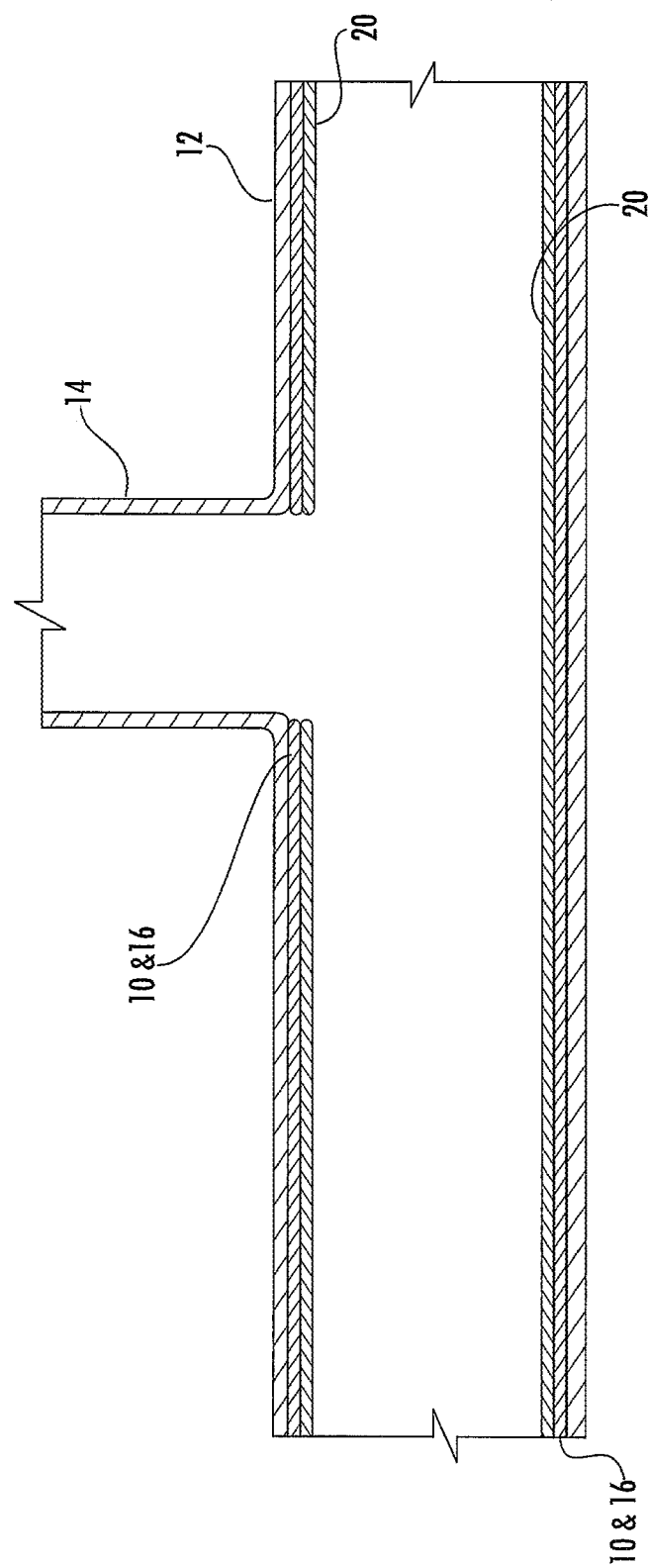
FIG. 13 is a sectional view of an embodiment where the sealing member is the preliner.

FIG. 13 shows an embodiment where the preliner 16 is also the sealing member 10. FIG. 13 shows this component having both reference numbers 10 and 16. The preliner 10, 16 is adapted to be positioned in the main pipe 12. The preliner 10, 16 is formed from a hydrophilic or hydrophobic material such as a hydrophilic or hydrophobic rubber or thermoplastic that is hydrophilic or hydrophobic. In this embodiment there is no need for a separate sealing member 10 because the preliner 10, 16 is at least partially made from sealing member 10 material. The preliner 10, 16 is pulled in place or inverted into the main pipe liner so that it covers one or more lateral pipe junctions. In one embodiment the mainline liner 20 is pulled or inverted into place inside of the preliner 10, 16 after the preliner 10, 16 has been positioned. In another embodiment the preliner 10, 16 and mainline liner 20 are pulled or inverted into place at the same time in a single step. After the liner 20 cures and hardens, a cutter is used to reinstate service to the lateral pipe 14. The preliner 10, 16 remains in place to act as a water stop at the main/lateral junction.

Figure 14:
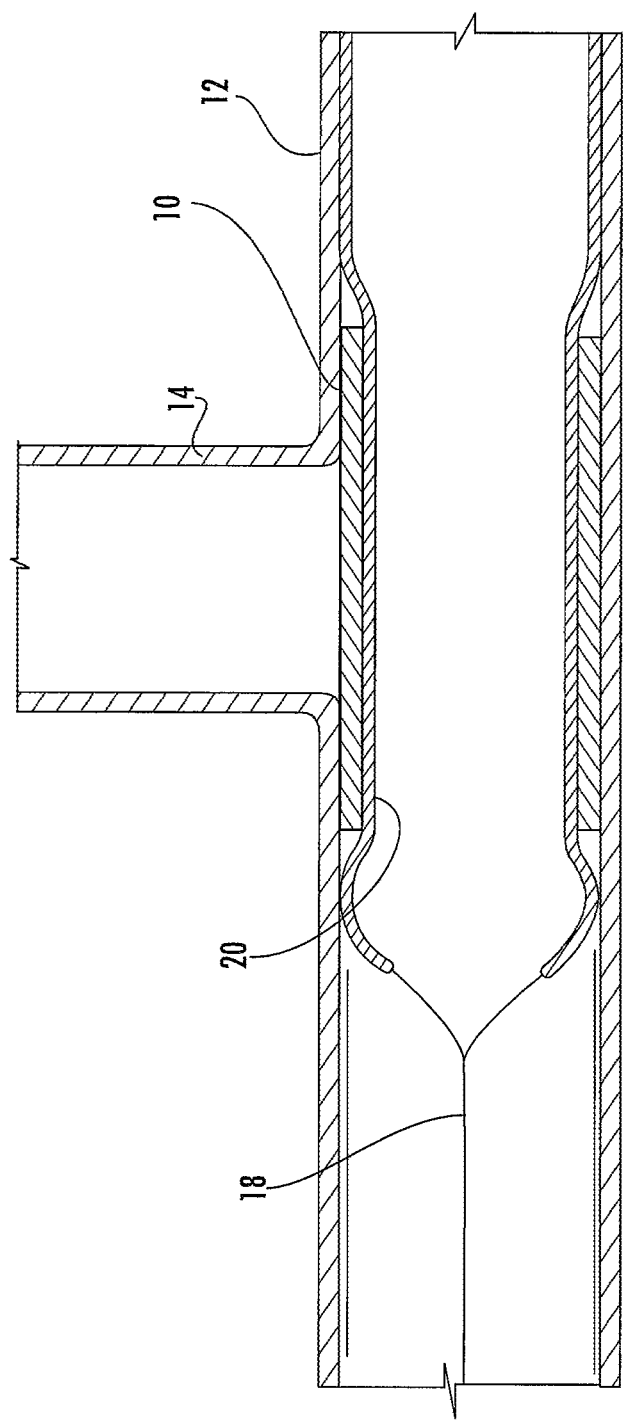
FIG. 14 is a sectional view of an embodiment wherein the sealing member is combined with the mainline liner (and no separate preliner is used).

FIG. 14 shows an embodiment that is similar to the other embodiments, except the mainline liner 20 is used as the positioning tube instead of a preliner 16. In other words, there is no separate preliner 16 used in this embodiment. The liner 20 has an exterior surface which includes an impermeable coating such as a plastic. The sealing member 10 is attached directly to the exterior surface of the liner 20 either before or after the liner 20 is impregnated with resin. The liner 20 is pulled into place within the pipeline 12 to locate the sealing member 10 at the main/lateral pipe junction. A bladder assembly may be positioned and inflated inside the liner 20 to help press the other components against the wall of the pipe 12.

The methods for using the assemblies described above include attaching the sealing member 10 to the preliner 16 then placing the preliner 16 and sealing member 10 in the main pipe 12 using pull-in-place or inversion methods. The sealing member 10 is aligned with the lateral pipe junction so that at least a portion of the sealing member 10 extends along the main pipe 12 on either side of the lateral pipe 14 opening. The mainline liner 20 is impregnated with resin and positioned in the main pipe 12 and pressed toward an inner wall of the main pipe 12 so that the sealing member is between the liner 20 and the pipe 12 wall as shown in FIG. 15. The sealing member 10 may be attached to either side of the preliner 16 resulting in the sealing member 10 being between the preliner 16 and the wall of the main pipe 12 or the sealing member 10 being between the liner 20 and the preliner 16. The mainline liner 20 may be pressed toward the inner wall of the main pipe 12 using an inflatable bladder assembly or without using a bladder as disclosed in U.S. Pat. No. 7,845,372 (Kiest), which is incorporated by reference. After the liner cures and hardens, a cutter is used to cut an opening in the mainline liner 20, preliner 16, and sealing member 10 to reinstate service to the lateral pipe as shown in FIG. 16. The sealing member 10 remains in place to act as a water stop at the main/lateral junction.

As mentioned above, other embodiments of the invention include methods and assemblies for repairing an opening in a length of pipe wherein the opening is a crack or hole in a length of pipe which is not at a pipe junction. The methods and assemblies described above with respect to FIGS. 1-8 and 13-16 may be used to repair an opening that is a crack or hole in a length of pipe. The descriptions of the methods and assemblies for these figures apply to repairing an opening that is a crack or hole along a length of pipe, except that when repairing an opening that is a crack or hole along a length of pipe the sealing member corresponds with and extends across the crack or hole in the pipe instead of across the junction between two pipes. Also, in these embodiments a cutter is not used to cut through layers of the assembly since the repair occurs along a length of pipe and not at a pipe junction requiring reinstatement of lateral pipe access.

Having thus described the invention in connection with the preferred embodiments thereof, it will be evident to those skilled in the art that various revisions can be made to the preferred embodiments described herein without departing from the spirit and scope of the invention. It is my intention, however, that all such revisions and modifications that are evident to those skilled in the art will be included with in the scope of the following claims.

What is claimed is as follows:

1. A method of repairing an opening in a main pipe, the method comprising:
    taking a mainline tubular preliner;
    attaching a tubular sealing member to the preliner such that the sealing member surrounds the preliner;
    positioning the preliner along the main pipe with the sealing member at the extending on either side of the opening and covering the opening;
    taking a mainline liner;
    applying a resinous material to the mainline liner, the resinous material capable of curing and hardening;
    positioning the mainline liner along the main pipe on an inside of the preliner;
    pressing the mainline liner against the preliner toward the main pipe; and
    allowing the resinous material to cure and harden.

2. The method of claim 1 wherein the opening is a lateral pipe extending from the main pipe at a pipe junction.

3. The method of claim 2 wherein the sealing member extends partially into the lateral pipe.

4. The method of claim 2 further comprising removing a portion of the mainline liner and the preliner at the pipe junction to reinstate a service connection to the lateral pipe.

5. The method of claim 1 wherein the preliner with the sealing member is pulled into place along the main pipe.

6. The method of claim 1 wherein the preliner with the sealing member is inverted into the main pipe.

7. The method of claim 1 wherein the mainline liner is inverted into the main pipe on the inside of the preliner.

8. The method of claim 1 wherein the sealing member is positioned between the preliner and the main pipe.

9. The method of claim 1 wherein the sealing member is hydrophilic or hydrophobic.

10. The method of claim 1 wherein the opening is a crack or hole in the main pipe.

11. A method of repairing a main pipe having a plurality of lateral pipes extending therefrom at pipe junctions, the method comprising:
    taking a mainline tubular preliner;
    attaching a plurality of sealing members to the preliner;
    positioning the preliner along the main pipe with each of the plurality of sealing members positioned between the preliner and the main pipe corresponding to the pipe junctions between the main pipe and the plurality of lateral pipes, and extending along a portion of the main pipe on opposite sides of each of the junctions and covering each of the junctions;
    taking a mainline liner;
    applying a resinous material to the mainline liner, the resinous material capable of curing and hardening;
    positioning the mainline liner along the main pipe on an inside of the preliner;
    pressing the mainline liner against the preliner toward the main pipe; and
    allowing the resinous material to cure and harden.

12. The method of claim 11 wherein each of the plurality of sealing members extends along a portion of the main pipe on opposite sides of the corresponding pipe junction.

13. The method of claim 12 wherein at least one of the plurality of sealing members is tubular shaped and surrounds a portion of the preliner.

14. The method of claim 12 wherein the at least one of the plurality of sealing members extends partially into one of the plurality of lateral pipes.

15. The method of claim 11 wherein the preliner with the plurality of sealing members is pulled into place along the main pipe.

16. The method of claim 11 wherein the preliner with the plurality of sealing members is inverted into the main pipe.

17. The method of claim 11 wherein the mainline liner is inverted into the main pipe on the inside of the preliner.

18. The method of claim 11 further comprising removing a portion of the mainline liner and the preliner at each of the pipe junctions to reinstate service connections to the plurality of lateral pipes.

19. The method of claim 11 wherein the plurality of sealing members are hydrophilic or hydrophobic.

20. A method of repairing a main pipe having an opening therein, the method comprising:
    taking a mainline tubular preliner;
    attaching a sealing member to the preliner;
    impregnating the sealing member with a hydrophobic or hydrophilic material capable of curing and expanding during interaction with water;
    positioning the preliner along the main pipe with the sealing member positioned between the preliner and the main pipe, and extending around the main pipe from one side of the opening to the other side of the opening and covering the opening;
    taking a mainline liner;
    applying a resinous material to the mainline liner, the resinous material capable of curing and hardening;
    positioning the mainline liner along the main pipe on an inside of the preliner;
    pressing the mainline liner against the preliner toward the main pipe; and
    allowing the resinous material to cure and harden.

21. The method of claim 20 wherein the opening is a lateral pipe extending from the main pipe at a pipe junction.

22. The method of claim 21 wherein the sealing member is a collar which extends along a portion of the main pipe on opposite sides of the pipe junction.

23. The method of claim 21 further comprising removing a portion of the mainline liner and the preliner at the pipe junction to reinstate service connection to the lateral pipe.

24. The method of claim 21 wherein at least one of the main pipe and the lateral pipe have a damaged portion and the method includes compressing the sealing member against the main or the lateral pipe such that the hydrophobic or hydrophilic material is substantially expelled from the sealing member and at least partially into the damaged portion of the main or the lateral pipe.

25. The method of claim 20 wherein the sealing member is a tubular sleeve which surrounds a portion of the preliner.

26. The method of claim 20 wherein the preliner with the sealing member is pulled into place along the main pipe.

27. The method of claim 20 wherein the mainline liner is inverted into the main pipe on the inside of the preliner.

28. The method of claim 20 wherein the sealing member is attached to the preliner before the sealing member is impregnated with the hydrophobic or hydrophilic material.

* * * * *